US010333320B2

(12) United States Patent
Salinas Ruiz et al.

(10) Patent No.: US 10,333,320 B2
(45) Date of Patent: Jun. 25, 2019

(54) STANDING HANGING-APPARATUS

(71) Applicants: Gabriel Salinas Ruiz, Mexico City (MX); Paulina Salinas Ruiz, Goleta, CA (US)

(72) Inventors: Gabriel Salinas Ruiz, Mexico City (MX); Paulina Salinas Ruiz, Goleta, CA (US)

( * ) Notice: Subject to any disclaimer, the term of this patent is extended or adjusted under 35 U.S.C. 154(b) by 70 days.

(21) Appl. No.: 15/815,542

(22) Filed: Nov. 16, 2017

(65) Prior Publication Data

US 2019/0044351 A1  Feb. 7, 2019

Related U.S. Application Data

(63) Continuation-in-part of application No. 29/612,776, filed on Aug. 3, 2017, now Pat. No. Des. 840,727.

(51) Int. Cl.
*H02J 7/00* (2006.01)
*A47B 47/00* (2006.01)

(52) U.S. Cl.
CPC ........ *H02J 7/0027* (2013.01); *A47B 47/0075* (2013.01); *H02J 7/0044* (2013.01)

(58) Field of Classification Search
CPC .................. H02J 7/0027; H02J 7/0044; H02J 7847/0075
USPC ................................................ 320/103, 113
See application file for complete search history.

(56) References Cited

U.S. PATENT DOCUMENTS

| 5,364,053 | A | * | 11/1994 | Rodgers | .................... | E04B 9/18 |
| | | | | | | 248/302 |
| 5,924,246 | A | * | 7/1999 | Jurgens | .................... | G09F 7/18 |
| | | | | | | 248/317 |
| 6,189,689 | B1 | * | 2/2001 | Toussaint | .................. | B42F 7/02 |
| | | | | | | 206/308.3 |
| 6,311,857 | B1 | | 11/2001 | Al-Darraji | | |
| 2013/0181049 | A1 | | 7/2013 | Aston | | |
| 2016/0020625 | A1 | * | 1/2016 | Tsou | .................... | H02J 7/0044 |
| | | | | | | 320/115 |

FOREIGN PATENT DOCUMENTS

| CN | 103859969 A | 6/2014 |
| CN | 104982258 A | 10/2015 |
| EP | 2859817 A1 | 4/2015 |

* cited by examiner

*Primary Examiner* — M Baye Diao
(74) *Attorney, Agent, or Firm* — Sheppard, Mullin, Richter & Hampton LLP

(57) ABSTRACT

A standing hanging-apparatus comprising a standing means for supporting the apparatus on a surface such as the ground, a hanging means for hanging an accessory from the apparatus, a storage means for storing a plurality of electronic devices, and a charging means for charging at least one of the plurality of electronic devices stored in the storage means. The standing means, hanging means, storage means, and charging means can be coupled to an elongated body defining a cavity, and the storage means is coupled such that it is centered over a center of gravity of the apparatus.

20 Claims, 5 Drawing Sheets

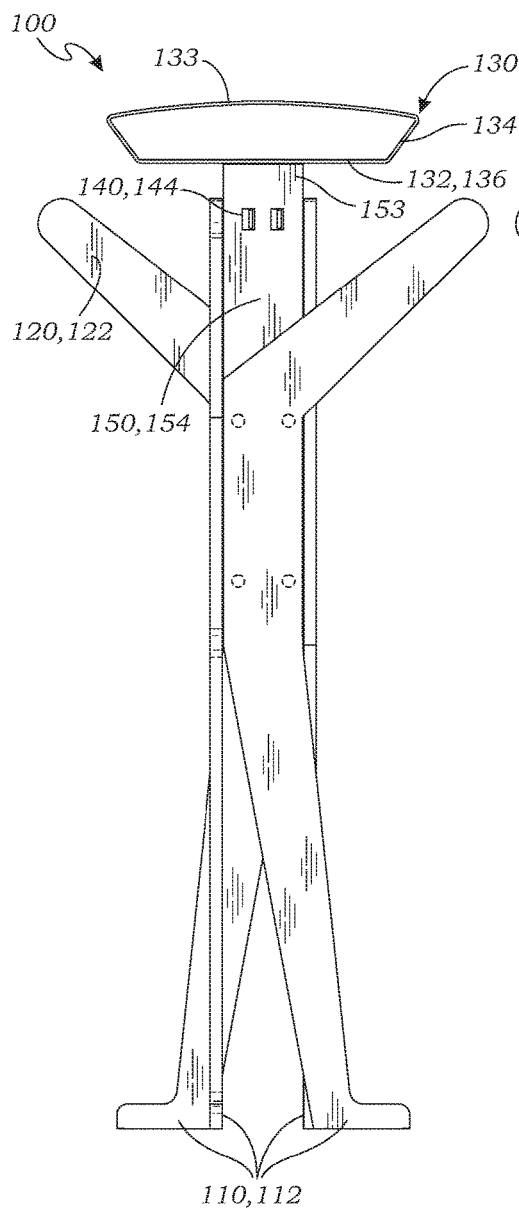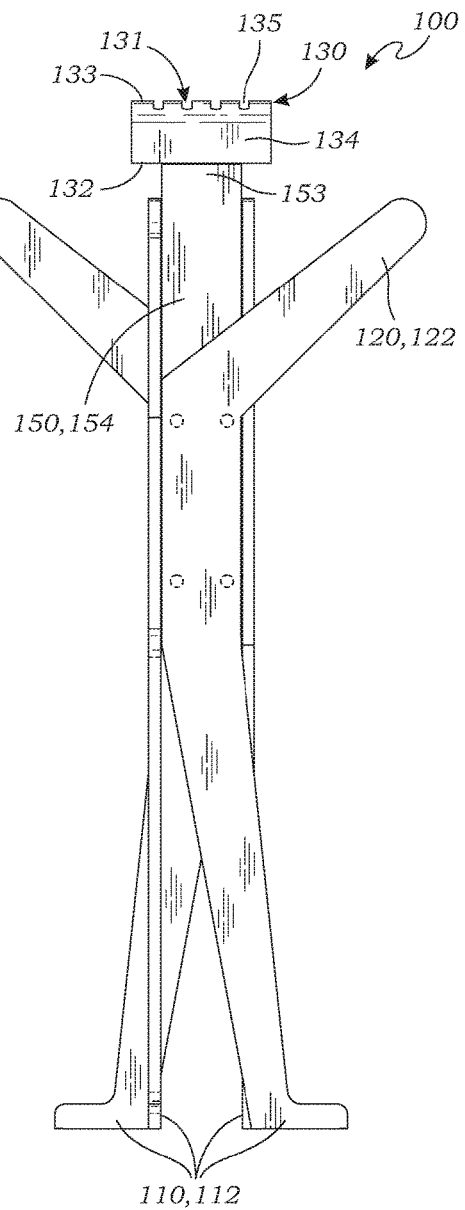

STANDING HANGING-APPARATUS

CROSS-REFERENCE TO RELATED APPLICATION

The present application is a continuation-in-part of U.S. Design patent application Ser. No. 29/612,776, entitled "Hanging Device," filed Aug. 3, 2017, the entire contents of which are incorporated by reference.

FIELD OF THE INVENTION

This invention relates generally to standing hanging-apparatus and, more particularly, to a standing hanging-apparatus having a charging station for charging electronic devices.

BACKGROUND

Standing hanging-devices, such as coat stands, have enjoyed widespread use and have been popular for centuries. Such devices typically include an elongated vertical body having a plurality of arms extending from the body to support personal accessories, such as bags, hats, canes, or scarves. In use, a person can place a personal accessory on an arm of the device so that the accessory is hung and suspended off the ground.

In the past, such devices have functioned only as simple hanging devices, although sometimes they have been configured to provide an additional, adjunct function of storing an article that might be used by a person near the device, e.g., shoes or sunglasses. These limited functions are satisfactory, but they fail to provide other valuable functions as well.

It should be appreciated that there is a need for an improved hanging device that is configured to provide an additional function of storing and charging personal electronic devices of varying size and shape, without compromising the device's ability to provide its normal function of conveniently and attractively storing a person's personal accessories. The present invention fulfills this need and provides further related advantages.

BRIEF SUMMARY OF THE INVENTION

The present invention is embodied in a standing hanging-apparatus for hanging personal accessories and for storing and charging a plurality of electronic devices. In one embodiment, the apparatus comprises an elongated body having a first end and a second end; a standing means for supporting the apparatus on a surface; a hanging means for hanging a plurality of electronic devices; and a charging means for charging at least one of the electronic devices stored in the storage means. The standing means, hanging means, and charging means are coupled to the elongated body. The storage means is coupled to the second end of the elongated body such that the storage means is centered over a center of gravity of the apparatus.

In one embodiment, the storage means comprises a vertical storage means for storing the electronic devices in a vertical orientation and a horizontal storage means for storing the electronic devices in a horizontal orientation. In another embodiment, the horizontal storage means comprises a substantially planar first panel coupled to the second end of the elongated body. In a further embodiment, the vertical storage means comprises the first panel, a second panel spaced from the first panel by a side panel, and an elongated slot defined in the second panel. In an additional embodiment, the second panel is convex.

In one embodiment, the elongated body comprises a sidewall extending from the first end to the second end. In another embodiment, the charging means comprises a battery disposed in a cavity defined by the elongated body. In a further embodiment, the charging means further comprises a power source connector coupled the elongated body and in electronic communication with the battery. In an additional embodiment, the power source connector is a universal serial bus connector. In yet another embodiment, the charging means further comprises a control circuit disposed in the cavity of the elongated body and in electronic communication with the battery and the universal serial bus connector.

In one embodiment, the standing hanging-apparatus further comprises a first panel pivotably coupled to the first end of the elongated body. In another embodiment, the standing means comprises a leg and the hanging means comprises an arm.

Each feature or concept outlined above is independent, but can be combined with any other feature or concept disclosed in this application.

The present invention is also embodied in a standing hanging-apparatus comprising an elongated body having a first end and a second end; a leg; an arm; a power source connector; and a storage means for storing a plurality of electronic devices. In one embodiment, the leg, arm, and power source connector are coupled to the elongated body. In another embodiment, the power source connector is in electronic communication with a power source disposed in a cavity defined by the elongated body. In a further embodiment, the storage means is coupled to the second end of the elongated body such that the storage means is centered over a center of gravity of the apparatus.

In one embodiment, the storage means comprises a vertical storage means for storing the electronic devices in a vertical orientation and a horizontal storage means for storing the electronic devices in a horizontal orientation. In another embodiment, the horizontal storage means comprises a substantially planar first panel coupled to the second end of the elongated body. In a further embodiment, the vertical storage means comprises the first panel, a second panel spaced from the first panel by a side panel, and an elongated slot defined in the second panel. In an additional embodiment, the second panel is convex.

In one embodiment, the power source comprises a battery. In another embodiment, the power source connector is a universal serial bus connector.

Each feature or concept outlined above is independent, but can be combined with any other feature or concept disclosed in this application.

The present invention is also embodied in a standing hanging-apparatus comprising an elongated body having a sidewall that extends from a first end to a second end. In one embodiment, the apparatus further comprises a leg, an arm, and a power source connector. In another embodiment, the leg, arm, and power source connector are coupled to the sidewall of the elongated body. In a further embodiment, the power source connector is in electronic communication with a battery disposed in a cavity defined by the elongated body. In an additional embodiment, the apparatus further comprises a substantially planar first panel coupled to the second end of the sidewall; and a second panel spaced from the first panel by a side panel, wherein the second panel is convex and comprises an elongated slot shaped to receive an electronic device. In yet another embodiment, the first panel, second panel, and side panel are centered over a center of gravity of the apparatus.

Each feature or concept is independent, but can be combined with any other feature or concept disclosed in this application. Other features and advantages of the invention should become apparent from the following description of the preferred embodiments, taken in conjunction with the accompanying drawings, which illustrate, by way of example, the principles of the invention.

BRIEF DESCRIPTION OF THE DRAWINGS

FIG. 3 is a front elevational view of a standing hanging-apparatus in accordance with one embodiment of the present invention.

FIG. 4 is a right-side elevational view of a standing hanging-apparatus in accordance with one embodiment of the present invention.

DETAILED DESCRIPTION OF THE PREFERRED EMBODIMENTS

With reference now to FIGS. 1A-6 of the illustrative drawings, there is shown a standing hanging-apparatus 100 in accordance with one embodiment of the present invention. As will be described in more detail below, the apparatus 100 can be configured to hang personal accessories 10, such as bags, hats, coats, canes, or scarves; and to store and charge personal electronic devices 20, such as phones or tablets.

Figure 1A:
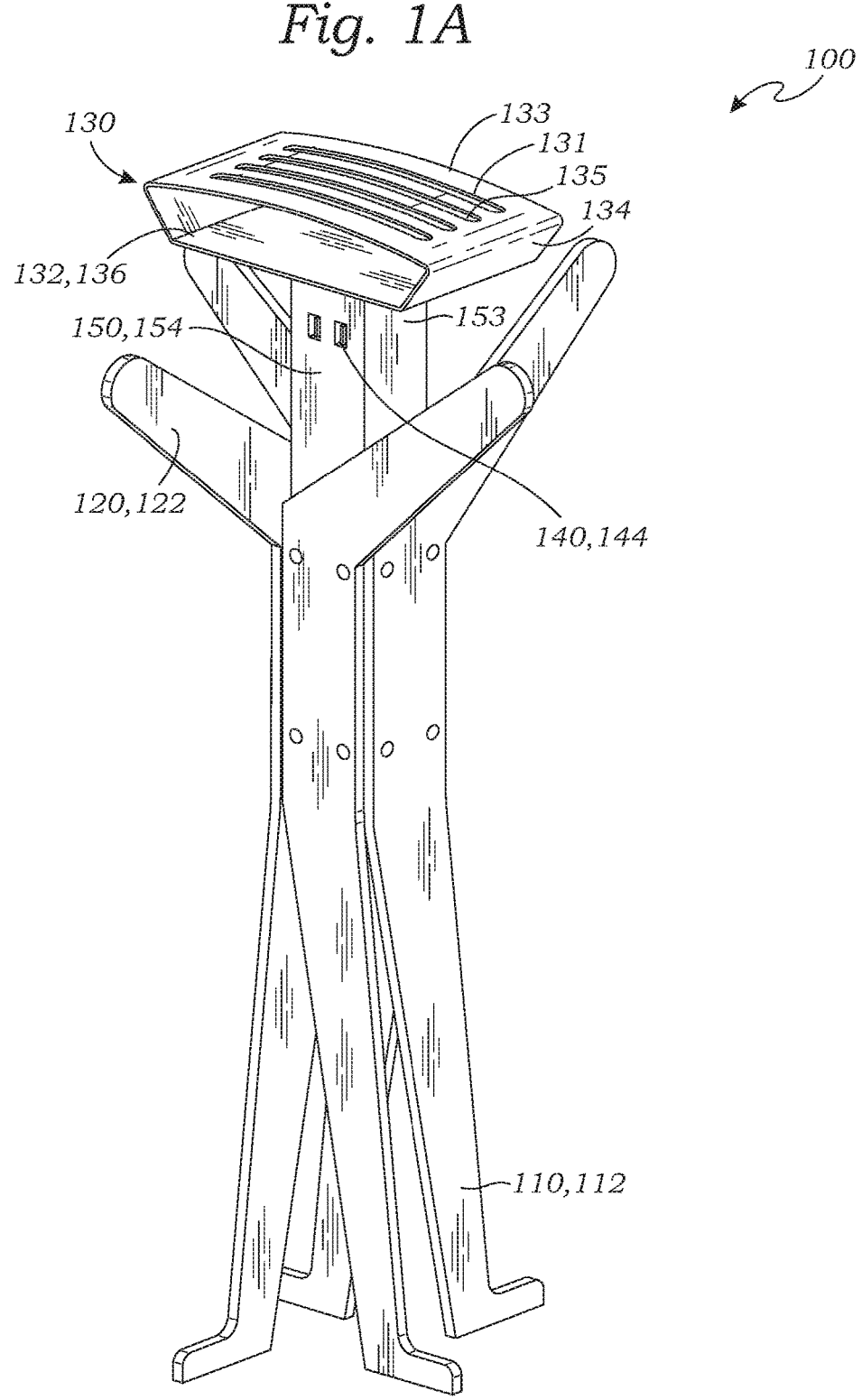
FIGS. 1A and 1B are front perspective views of a standing hanging-apparatus in accordance with one embodiment of the present invention.
Figure 1B:
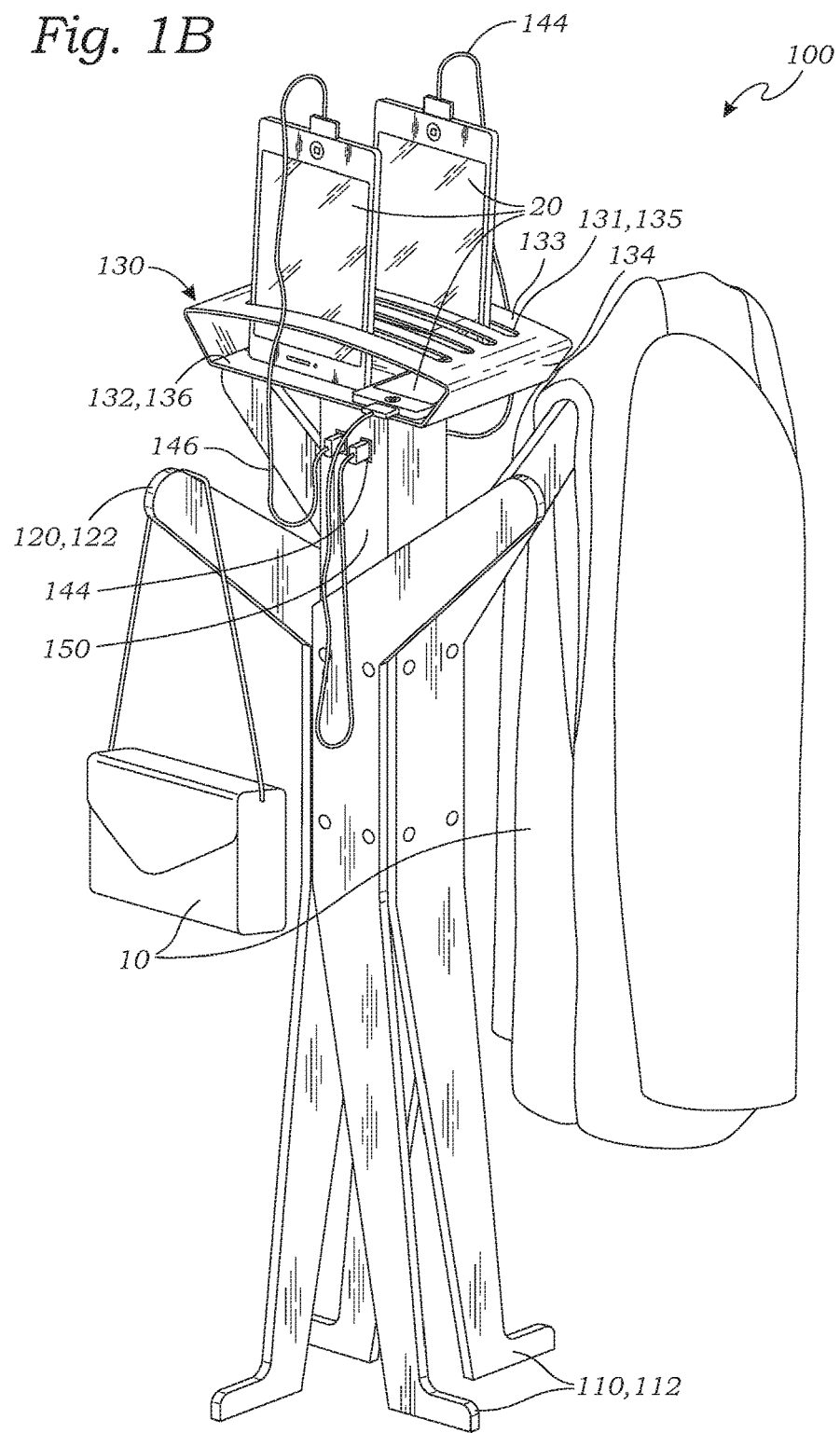

With particular reference to FIGS. 1A and 1B, in one embodiment, the apparatus 100 can include a standing means 110 for supporting the apparatus 100 on a surface such as the ground, a hanging means 120 for hanging an accessory 10 from the apparatus 100, a storage means 130 for storing a plurality of electronic devices 20, and a charging means 140 for charging at least one of the plurality of electronic devices 20 stored in the storage means 130.

Figure 2:
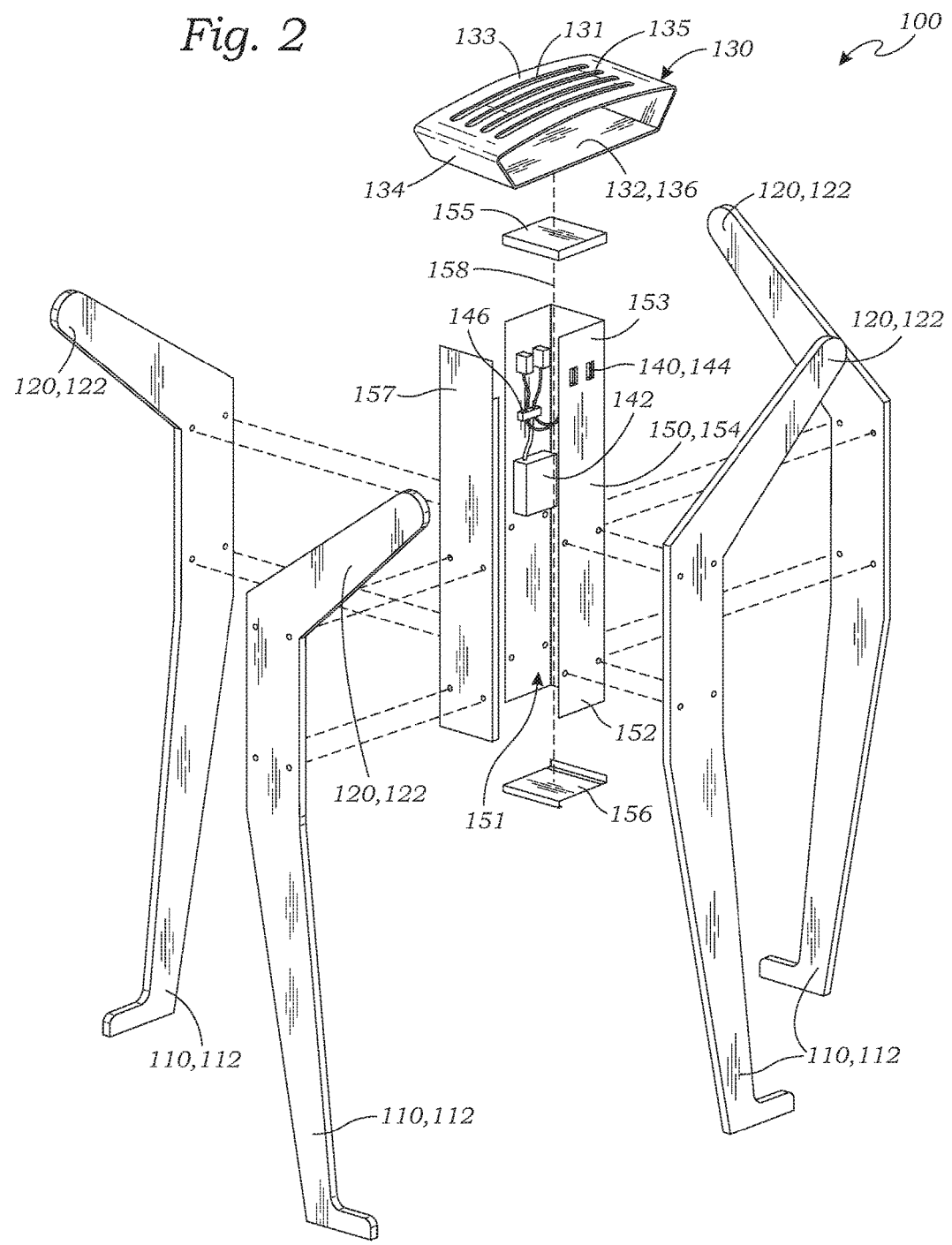
FIG. 2 is an exploded perspective view of a standing hanging-apparatus in accordance with one embodiment of the present invention.
Figure 5:
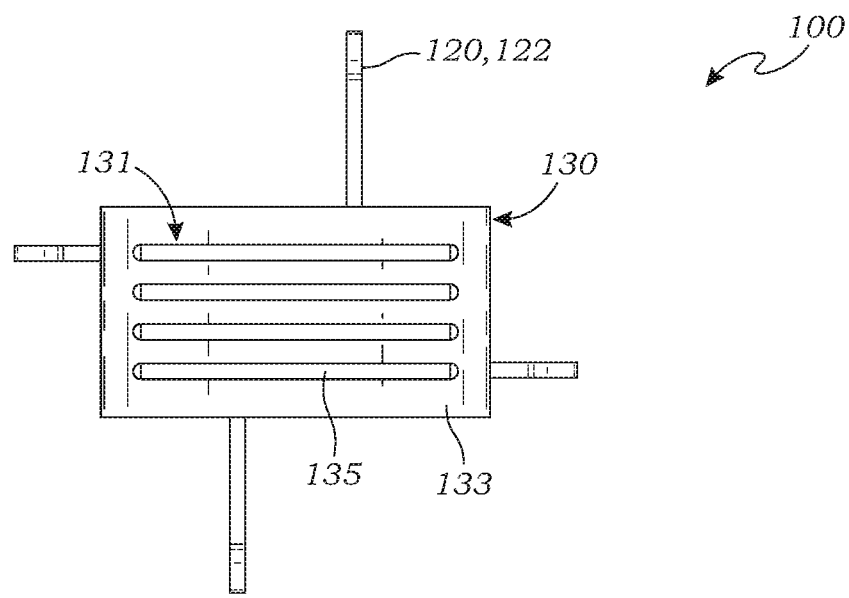
FIG. 5 is a top plan view of a standing hanging-apparatus in accordance with one embodiment of the present invention.
Figure 6:
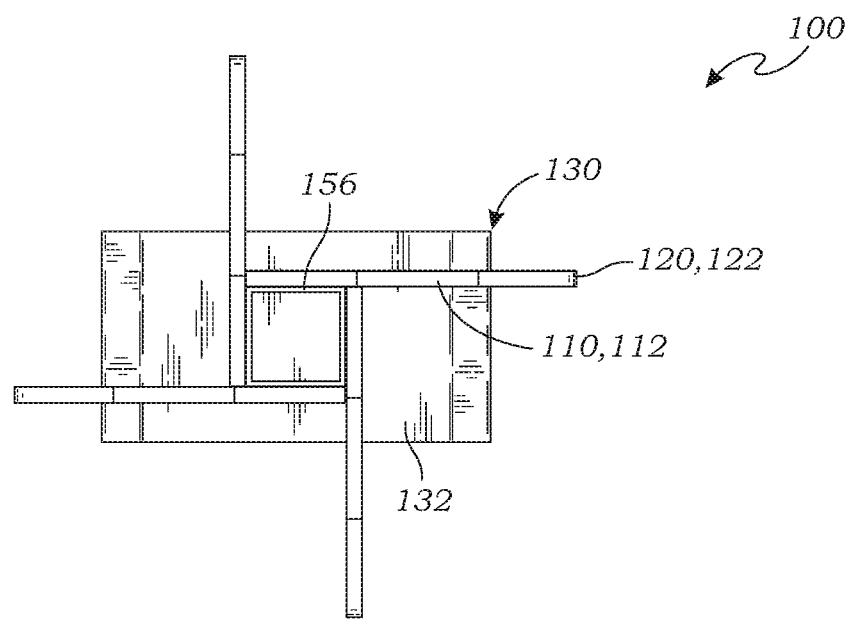
FIG. 6 is a bottom plan view of a standing hanging-apparatus in accordance with one embodiment of the present invention.

With reference to FIG. 2, in one embodiment, the standing means 110, hanging means 120, storage means 130, and charging means 140 can be coupled to an elongated body 150 defining a cavity 151. In another embodiment, the elongated body 150 can comprise a first end 152, a second end 153, and at least one sidewall 154 extending from the first end 152 to the second end 153. The elongated body 150 is depicted as a square prism comprising a U-shaped sidewall 154 and a side panel 157, but the elongated body 150 can include a single sidewall 154 and can be cylindrical or have any other three-dimensional shape. In a further embodiment, the elongated body 150 can define an axis 158 that extends through the cavity 151 from the first end 152 of the elongated body 150 to the second end 153 of the elongated body 150.

In one embodiment, the elongated body 150 can further include a lower panel 156 and an upper panel 155. In another embodiment, the lower panel 156 can be hingedly coupled to the first end 152 of the sidewall 154 of the elongated body 150 and allow easy access to the cavity 151. In a further embodiment, the elongated body 150 can comprise a material selected from the group consisting of metal, wood, and plastic.

With continued reference to FIG. 2, in one embodiment, the charging means 140 can comprise a power source 142 electronically coupled to a power source connector 144. In another embodiment, the power source 142 can comprise a utility power plug or a battery. In a further embodiment, the power source 142 can comprise a battery disposed in the cavity 151 of the elongated body 150. In an additional embodiment, the power source 142 can comprise a plurality of batteries. In embodiments where the power source 142 comprises one or more batteries, the first end 152 of the elongated body 150 can be kept open to allow easy access to the cavity 151 for recharging or replacing the batteries. Alternatively, as mentioned above, the elongated body 150 can include a lower panel 155 that is hingedly connected to the first end 152 of the sidewall 154 to allow easy access to the cavity 151 for recharging or replacing the batteries.

In one embodiment, the power source connector 144 can be coupled to the elongated body 150. In another embodiment (not shown), the power source connector 144 can be coupled to the first panel 132 of the storage means 130. As shown in FIG. 1B, in a further embodiment, the power source connector 144 can be a universal serial bus connector, and an electronic device 20 can be electronically coupled to the power source connector 144 via a power cord 146, such as a USB cord. In an alternative embodiment, the power source connector 144 can be a wireless charging surface (not shown), such as an inductive charger coupled to the first panel 132 of the storage means 130.

In one embodiment, the charging means 140 can further comprise a circuit 146 disposed in the cavity 151 and in electronic communication with the power source 142. In another embodiment, the circuit 146 can be operable to control the recharging of multiple electronic devices 20. In a further embodiment, the circuit 146 can be configured to aggregate power supplied by a plurality of power sources 142 to the power source connector 144. In an additional embodiment, the circuit 146 can be configured to aggregate and distribute the power supplied by the power sources 142 to a plurality of power source connectors 144.

With general reference to FIGS. 1A-6, in one embodiment, the standing means 110 can comprise a leg 112. In another embodiment, the standing means 110 can comprise four legs 112. In a further embodiment, the leg 112 can be coupled to the at least one sidewall 154 of the elongated body 150. In an additional embodiment, the leg 112 can extend beyond the at least one sidewall 154 to the surface below the first end 152 of the elongated body 150. In yet another embodiment, the leg 112 can be angled from the axis 158 defined by the elongated body 150. In one embodiment, the leg 112 can comprise a material selected from the group consisting of metal, wood, and plastic.

In one embodiment, the hanging means 120 can comprise an arm 122. In another embodiment, the hanging means 120 can comprise four arms 122. In a further embodiment, the arm 122 can be coupled to the at least one sidewall 154 of the elongated body 150. In an additional embodiment, the arm 122 can extend upwardly to support an accessory 10 such as a purse, bag, hat, coat, or scarf. In yet another embodiment, the arm 122 can be angled from the axis 158 defined by the elongated body 150. In one embodiment, the arm 122 can comprise a material selected from the group consisting of metal, wood, and plastic.

In one embodiment, the storage means 130 is coupled to the second end 153 of the elongated body 150 such that the storage means 130 is centered over a center of gravity of the apparatus 100. The storage means 130 can be coupled to the sidewall 154, the first, upper panel 155, or both.

With particular reference to FIG. 1B, in one embodiment, the storage means 130 can comprise a vertical storage means 131 for storing electronic devices 20 in a substantially vertical orientation and a horizontal storage means 136 for storing electronic devices 20 in a substantially horizontal orientation. In another embodiment, the horizontal storage means 136 can comprise a substantially planar first panel 132, and one or more electronic devices 20 can rest on the first panel 132 in a substantially horizontal orientation. In a further embodiment, the first panel 132 can be coupled to the second end 153 of the elongated body 150. In an additional embodiment, the first panel 132 can be coupled to the sidewall 154, the second, upper panel 155 (FIG. 2), or both.

In one embodiment, the vertical storage means 131 can comprise the substantially planar first panel 132, a second panel 133 spaced from the first panel 132 by a side panel 134, and an elongated slot 135 defined in the second panel 133. In another embodiment, four or more elongated slots 135 can be defined in the second panel 133. In a further embodiment, the elongated slot 135 is sized and shaped to allow a portion 22 of an electronic device 20 to pass through the slot 135 in the second panel 133 so that an end 24 of the device 20 can rest on the first panel 132 while the second panel 133 supports the device 20 in a substantially vertical orientation. In an additional embodiment, the second panel 133 is convex. In a further embodiment, the storage means 130 can comprise a material selected from the group consisting of metal, wood, and plastic.

In use, a person can hang a personal accessory 10 on an arm 122 of the apparatus 100 and compactly store a plurality of personal electronic device 10 in a variety of orientations. While in storage, the personal electronic devices 10 can be electronically coupled to the power source 142 for recharging.

It should be appreciated from the foregoing description that the present invention provides an improved standing hanging-apparatus 100 that not only provides hanging support for a person's accessories 10 (e.g., hats, coats, bags, scarves, canes, etc.), but that also provides a convenient and compact storage compartment 130 for storing and charging a number of electronic devices 20 in a variety of orientations, all while minimizing the physical footprint of the apparatus itself.

Specific methods, devices, and materials are described, although any methods and materials similar or equivalent to those described can be used in the practice or testing of the present embodiment. Unless defined otherwise, all technical and scientific terms used herein have the same meanings as commonly understood by one of ordinary skill in the art to which this embodiment belongs.

The terms "a," "an," and "at least one" encompass one or more of the specified element. That is, if two of a particular element are present, one of these elements is also present and thus "an" element is present. The terms "a plurality of" and "plural" mean two or more of the specified element.

The term "or" used between the last two of a list of elements means any one or more of the listed elements. For example, the phrase "A, B, or C" means "A, B, and/or C," which means "A," "B," "C," "A and B," "A and C," "B and C," or "A, B, and C."

The term "coupled" generally means physically coupled or linked and does not exclude the presence of intermediate elements between the coupled items absent specific contrary language.

Without further elaboration, it is believed that one skilled in the art, using the proceeding description, can make and use the present invention to the fullest extent. The invention has been described in detail with reference only to the presently preferred embodiments. Persons skilled in the art will appreciate that various modifications can be made without departing from the invention.

The invention claimed is:

1. A standing hanging-apparatus comprising:
an elongated body having a first end and a second end;
a standing means for supporting the apparatus on a surface, the standing means coupled to the elongated body;
a hanging means for hanging an accessory on the apparatus, the hanging means coupled to the elongated body;
a storage means for storing a plurality of electronic devices, the storage means coupled to the second end of the elongated body such that the storage means is centered over a center of gravity of the apparatus; and
a charging means for charging at least one of the electronic devices stored in the storage means, the charging means coupled to the elongated body.

2. The standing hanging-device of claim 1, wherein the storage means comprises a vertical storage means for storing the electronic devices in a vertical orientation and a horizontal storage means for storing the electronic devices in a horizontal orientation.

3. The standing hanging-device of claim 2, wherein the horizontal storage means comprises a substantially planar first panel coupled to the second end of the elongated body.

4. The standing hanging-device of claim 3, wherein the vertical storage means comprises the first panel, a second panel spaced from the first panel by a side panel, and an elongated slot defined in the second panel.

5. The standing hanging-device of claim 4, wherein the second panel is convex.

6. The standing hanging-device of claim 5, wherein the elongated body comprises a sidewall extending from the first end to the second end.

7. The standing hanging-device of claim 6, wherein the charging means comprises a battery disposed in a cavity defined by the elongated body.

8. The standing hanging-device of claim 7, wherein the charging means comprises a power source connector coupled the elongated body and in electronic communication with the battery.

9. The standing hanging-device of claim 8, wherein the power source connector is a universal serial bus connector.

10. The standing hanging-device of claim 9, wherein the charging means comprises a control circuit disposed in the cavity of the elongated body and in electronic communication with the battery and the universal serial bus connector.

11. The standing hanging-device of claim 10, further comprising a first panel pivotably coupled to the first end of the elongated body.

12. The standing hanging-device of claim 11, wherein the standing means comprises a leg and the hanging means comprises an arm.

13. A standing hanging-apparatus comprising:
an elongated body having a first end and a second end;
a leg coupled to the elongated body;
an arm coupled to the elongated body;
a power source connector coupled to the elongated body and in electronic communication with a power source disposed in a cavity defined by the elongated body; and
a storage means for storing a plurality of electronic devices, the storage means coupled to the second end of the elongated body such that the storage means is centered over a center of gravity of the apparatus.

14. The standing hanging-device of claim 13, wherein the storage means comprises a vertical storage means for storing the electronic devices in a vertical orientation and a horizontal storage means for storing the electronic devices in a horizontal orientation.

15. The standing hanging-device of claim 14, wherein the horizontal storage means comprises a substantially planar first panel coupled to the second end of the elongated body.

16. The standing hanging-device of claim 15, wherein the vertical storage means comprises the first panel, a second panel spaced from the first panel by a side panel, and an elongated slot defined in the second panel.

17. The standing hanging-device of claim 16, wherein the second panel is convex.

18. The standing hanging-device of claim 17, wherein the power source comprises a battery.

19. The standing hanging-device of claim 18, wherein the power source connector is a universal serial bus connector.

20. A standing hanging-apparatus comprising:
an elongated body having a sidewall that extends from a first end to a second end;
a leg coupled to the sidewall of the elongated body;
an arm coupled to the sidewall of the elongated body;
a power source connector coupled to the sidewall of the elongated body and in electronic communication with a battery disposed in a cavity defined by the elongated body;
a substantially planar first panel coupled to the second end of the sidewall; and
a second panel spaced from the first panel by a side panel, wherein the second panel is convex and comprises an elongated slot shaped to receive an electronic device;
wherein the first panel, second panel, and side panel are centered over a center of gravity of the apparatus.

* * * * *